(12) United States Patent
Buhler et al.

(10) Patent No.: US 7,932,655 B2
(45) Date of Patent: Apr. 26, 2011

(54) MAGNETIC BEARING DEVICE WITH AN IMPROVED VACUUM FEEDTHROUGH

(75) Inventors: Philipp Buhler, Zurich (CH); Rene Larsonneur, Winterthur (CH)

(73) Assignee: Mecos Traxler AG, Winterthur (CH)

( * ) Notice: Subject to any disclaimer, the term of this patent is extended or adjusted under 35 U.S.C. 154(b) by 369 days.

(21) Appl. No.: 12/064,523

(22) PCT Filed: Aug. 18, 2006

(86) PCT No.: PCT/CH2006/000441
§ 371 (c)(1),
(2), (4) Date: Feb. 22, 2008

(87) PCT Pub. No.: WO2007/022657
PCT Pub. Date: Mar. 1, 2007

(65) Prior Publication Data
US 2008/0231128 A1    Sep. 25, 2008

(30) Foreign Application Priority Data
Aug. 24, 2005   (EP) ................................. 05405492

(51) Int. Cl.
*H02K 7/09* (2006.01)
(52) U.S. Cl. ............ 310/90.5; 310/68 B; 310/71; 310/90
(58) Field of Classification Search ................ 310/90.5, 310/68 B, 68 R, 90; *H02K 7/09*
See application file for complete search history.

(56) References Cited

U.S. PATENT DOCUMENTS

| | | | |
|---|---|---|---|
| 4,490,614 A | 12/1984 | Peerenboom et al. | |
| 5,629,574 A * | 5/1997 | Cognetti et al. | 310/71 |
| 6,081,056 A * | 6/2000 | Takagi et al. | 310/89 |
| 6,121,704 A * | 9/2000 | Fukuyama et al. | 310/90.5 |
| 6,175,174 B1 * | 1/2001 | Takahashi | 310/90.5 |
| 6,267,386 B1 | 7/2001 | Loll et al. | |
| 6,498,411 B2 * | 12/2002 | Kanebako | 310/90.5 |
| 6,503,050 B2 * | 1/2003 | Reimer et al. | 415/90 |
| 6,707,185 B2 * | 3/2004 | Akutsu et al. | 310/71 |
| 6,778,203 B2 * | 8/2004 | Itami et al. | 347/243 |
| 6,882,072 B2 * | 4/2005 | Wingett et al. | 310/74 |
| 6,897,587 B1 * | 5/2005 | McMullen et al. | 310/90.5 |
| 7,253,546 B2 * | 8/2007 | Fukuda et al. | 310/179 |
| 7,298,061 B2 * | 11/2007 | Kyoden | 310/68 R |

(Continued)

FOREIGN PATENT DOCUMENTS

DE    4038394 A1    6/1992

(Continued)

*Primary Examiner* — Quyen Leung
*Assistant Examiner* — John K Kim
(74) *Attorney, Agent, or Firm* — Sughrue Mion, PLLC

(57) ABSTRACT

A magnetic bearing device (1) with an improved vacuum-tight electrical feedthrough through its housing (10) is disclosed. The feedthrough (30) comprises a flat connection element (31) such as a rigid or flexible printed circuit board extending through the wall of the housing (10), preferably all the way along an inner circumference of the housing. The connection element is sealed in a gas-tight manner to the housing. The element preferably has a central opening (36) for receiving the rotor shaft. Connections to the bearing units and sensors may be achieved by flat-ribbon cables (51) or flexprints. The sensors are preferably also implemented as printed sensors. Thus a very compact and cost-efficient magnetic bearing device can be obtained. An alternative embodiment uses a connection element on a side wall of the housing as a feedthrough to the bearing components.

15 Claims, 5 Drawing Sheets

U.S. PATENT DOCUMENTS

| | | | |
|---|---|---|---|
| 2002/0070617 A1* | 6/2002 | Kanebako | 310/90.5 |
| 2004/0007935 A1* | 1/2004 | Kimura et al. | 310/254 |
| 2004/0251753 A1* | 12/2004 | Wingett et al. | 310/74 |
| 2005/0082928 A1* | 4/2005 | Giles et al. | 310/90.5 |
| 2005/0168853 A1* | 8/2005 | Kyoden | 359/873 |
| 2005/0265881 A1* | 12/2005 | Davidson et al. | 418/61.3 |
| 2006/0163962 A1* | 7/2006 | Shimada | 310/90.5 |
| 2007/0024138 A1* | 2/2007 | Buhler et al. | 310/90.5 |
| 2008/0231128 A1* | 9/2008 | Buhler et al. | 310/90.5 |

FOREIGN PATENT DOCUMENTS

| | | |
|---|---|---|
| EP | 0375271 A2 | 6/1990 |
| EP | 1517042 A1 | 3/2005 |
| WO | WO 2005026557 A1 * | 3/2005 |

* cited by examiner

MAGNETIC BEARING DEVICE WITH AN IMPROVED VACUUM FEEDTHROUGH

FIELD OF THE INVENTION

The present invention relates to a magnetic bearing device with the features of the preamble of claim 1.

BACKGROUND OF THE INVENTION

In the art, magnetic bearing devices are well known in which a rotor is supported for rotation around a rotation axis by a set of active magnetic bearings. These active magnetic bearings are generally arranged within a housing together with a set of displacement sensors. The sensor signals are fed to a controller external to the housing, and depending on these signals, electric currents are provided to the magnetic bearings by the controller. Therefore, an electrical feedthrough for connections between the bearings and sensors within the housing and the controller outside of the housing through a wall of the housing is required. In many applications, such a feedthrough must be sealed in a gastight manner because of the presence of pressure differences between the inside and the outside of the housing. An important application is a turbo-molecular pump whose rotor carrying the rotor blades is supported by a magnetic bearing device. During operation of such a pump, the rotor and thus the inside of the housing will be at high-vacuum conditions, i.e., in the range below 0.1 mbar, while the outside is generally at ambient pressure. Therefore, any electrical feedthrough between the inside and the outside must be efficiently sealed to prevent vacuum losses.

Vacuum-tight electrical feedthroughs are well known in the art. In particular, so-called multipin feedthroughs are known which are placed into a small circular opening in a wall of the housing and which provide a plurality of connections in a single feedthrough. Due to the necessity of individually sealing a large number of wires, manufacture of such feedthroughs is relatively expensive, and the cost of the feedthrough may thus contribute significantly to the total cost of the magnetic bearing device. Additionally, multipin feedthroughs may be rather bulky, which hampers the development of small, low-cost magnetic bearings.

In WO-A 2005/038263 it has been suggested to reduce the number of wires which need to be fed through a wall of the housing by casting certain control circuits in a resin and disposing these circuits within the housing instead of outside of the housing. These circuits may, however, be exposed to a hostile environment (vacuum or aggressive gases and high temperatures) within the housing, which decreases the lifespan of the circuits, and the circuits are inaccessible from the outside for servicing, e.g., for an exchange in case of a hardware failure.

SUMMARY OF THE INVENTION

It is therefore an object of the present invention to provide a magnetic bearing device in which a gas-tight electrical connection between the inside and the outside of the housing is established in a simple manner and at a reduced cost.

This object is achieved by a magnetic bearing device according to claim 1. Advantageous embodiments of the invention are laid down in the dependent claims.

Thus, a magnetic bearing device for supporting a rotor shaft for rotation around a rotation axis is disclosed. The magnetic bearing device comprises a housing having an inside and an outside;
at least one active magnetic bearing element disposed in the inside of said housing; and
a feedthrough for providing a plurality of electrical connections between the inside and the outside of said housing.

According to the present invention, the feedthrough comprises an essentially flat connection element which extends across a wall of said housing. Sealing means are provided for sealing said connection element with said housing in a gas-tight manner.

The term "flat connection element" encompasses any essentially flat element comprising a plurality of electrically insulated electric conductors connecting the inside and the outside of the housing. The conductors are arranged essentially in a common plane in one or more parallel layers. The connection element may be essentially planar (i.e., extending only in a plane), or it may have bends. Preferably, at least the region of the connection element which extends across the wall of the housing is essentially planar. If there are any bends, these preferably occur in the inside or on the outside of the housing.

In particular, the connection element may be a rigid, flexible or rigid-flex printed circuit board (PCB). In the context of the present invention, the term "printed circuit board" encompasses any substantially flat arrangement of at least one electrically insulating substrate layer carrying at least one conductive layer, wherein the layers may be rigid or flexible. Preferably, each conductive layer, also called a trace layer, is covered on both sides by a substrate layer. A special embodiment is a flexible PCB, sometimes called a "flexprint" or flex circuit, which allows for bends whose radius is substantially smaller than the length of the PCB. This is achieved by the use of highly flexible substrate materials (e.g., films of polyimide materials such as Kapton® manufactured by DuPont®) and thin substrate layers. Also encompassed by the term PCB is a so-called rigid-flex PCB, sometimes also called a rigid-flex circuit, having both rigid and flexible sections.

Using a flat connection element for the electrical feedthrough simplifies the construction of the feedthrough considerably, reducing the cost of the feedthrough. In the case of a printed circuit board or a flexprint, the substrate provides sealing and insulation of all conductors simultaneously without the need of sealing each conductor individually. A large number of conductors can be carried in the conductive layer or layers of a printed circuit board simultaneously, and the current and voltage rating of the conductors can easily be adapted to the actual requirements by providing broader or thinner traces and larger or smaller gaps between traces in the conductive layer(s). In particular, a custom-designed PCB may be used depending on the actual connections required for each magnetic bearing device in which the feedthrough is to be used. Because of its flat shape, the PCB can be easily sealed to the housing. In addition, a feedthrough according to the present invention requires very little space along the dimension perpendicular to the plane of the connection element.

In particular, sealing is much simplified if the connection element intersects the wall of the housing all the way along a circumference of said housing. In this case, no sealing at the edges of the connection element is needed, where sealing is much more difficult than on the flat sides of the connection element. The housing may be intersected by the connection element in a region where the cross-section is rather large, or the housing may have a comparatively small protrusion whose wall is intersected by the connection element.

Preferably, the connection element extends through the housing in a plane essentially perpendicular to the rotation axis. In this case, the connection element preferably has an opening for receiving the rotor shaft. Both measures enable a compact design. Providing a central opening additionally enables a free choice of where the feedthrough may be disposed along the rotor axis. Preferably, the feedthrough is disposed near an axial bearing unit on that side of the unit which points away from the radial bearing units.

Normally, the rotor shaft will carry a thrust disk. Assembly of the magnetic bearing device is simplified if the opening of the connection element has a diameter larger than the diameter of said thrust disk. In addition, it is preferable that the dimensions of the opening are larger than the lateral dimensions of any axial bearing units. In this way, the axial bearing can be assembled with the feedthrough already in place. Therefore other parts like motors and radial bearing can be assembled and wired to the feedthrough before assembly of rotor and axial bearing.

In an alternative embodiment, the connection element may extend essentially parallel to the rotor axis along one (lateral) side of the housing. In this case, the same connection element may form a plurality of separate feedthroughs at different positions along the housing. This substantially simplifies wiring on the inside of the housing at the expense of more sealing points between the connection element and the housing.

The sealing means preferably comprise a first O-ring disposed on a first flat side of the connection element. In addition, a second O-ring disposed on a second flat side of the connection element may be present. These O-rings serve to seal the connection element with the housing in a gas-tight manner. The housing may have at least one ring-shaped groove facing the connection element for receiving said first O-ring or said second O-ring. Thereby, the O-rings are received in a well-defined position, and sealing is improved by the presence of the edges of the grooves. Alternatively, one or more flat gaskets may be used. The seals can also be moulded directly to the connection element, in particular, printed circuit board.

In order to improve tightness, the connection element may be additionally coated in an gas-tight manner. In particular, a coating may be applied to the circumferential edges at an inner and/or outer circumference of the connection element, in particular if the connection element is a printed circuit board.

A very simple setup which is easily assembled results if the magnetic bearing device comprises a sensor board with at least one sensor for detecting displacements (in particular, axial displacements) and/or a rotary state of the rotor shaft, said sensor board being directly electrically connected to the feedthrough by means of a connector bridging an axial gap between said feedthrough and said sensor board. The connector is preferably releasable and comprises a socket for receiving a plurality of pins. In this case, no additional cabling is needed for the sensors implemented on the board, and the board can easily be removed in case that servicing of the magnetic bearing device is required. The sensor board may in addition comprise connections for a bearing unit, in particular, an axial (thrust) bearing unit. Said bearing unit (in particular, its coil wires) may be directly connected to the sensor board without further cabling.

For connecting further sensors and bearing units to the feedthrough, the magnetic bearing device advantageously comprises at least one flat-ribbon cable or a flexprint connected to the feedthrough on the inside of said housing. This connection may be achieved, e.g., by a suitable connector, e.g., of the multi-pin socket-and-plug type. Alternatively, the connection may be of the wire-terminal type (German: Schneidklemme), or the cable/flexprint may be directly connected to the feedthrough, e.g., by soldering.

In order to simplify distribution of electric energy and signals within the housing, the magnetic bearing device may further comprise one or more distribution boards, these boards being connected with each other and/or to the feedthrough by flat-ribbon cables or flexprints. Each distribution board extends perpendicular to the rotation axis, has an opening for receiving the rotor shaft and comprises a plurality of electrical conductors for distributing signals carried by the flat-ribbon cable(s) or flexprint(s). The distribution board may be adapted for directly connecting the coil wires of bearing units to it, e.g., by wire terminals.

If the connection element is at least partially flexible (e.g., a flexprint or a rigid-flex PCB), the connection element itself may be used as the cabling on the inside of the housing and/or as a distribution board without the need of additional wiring. To this end, the connection element may comprise at least a first section which is essentially planar and extends between the inside and the outside of said housing, a second section which is flexible and has at least one substantial bend, and a third section which is essentially planar and comprises a plurality of electrical conductors for distributing signals. All sections may be flexible, or the first and/or third sections may be essentially rigid.

Advantageously, the distribution board serves at the same time as a sensor board, i.e., it comprises a displacement sensor for detecting displacements of the rotor shaft. Advantageously, the displacement sensor is implemented directly in the conducting layer(s) of the distribution/sensor board. In other words, the distribution/sensor board advantageously comprises a plurality of inductive elements implemented as printed coils within at least one conductive layer of the distribution board.

The invention is further directed at a vacuum pump comprising magnetic bearing device as claimed.

BRIEF DESCRIPTION OF THE DRAWINGS

The invention will be described in more detail in connection with exemplary embodiments illustrated in the drawings, in which FIG. 1. shows a schematic perspective view of a magnetic bearing device according to a first embodiment, partially in a sectional view.

DETAILED DESCRIPTION OF PREFERRED EMBODIMENTS

Figure 1:
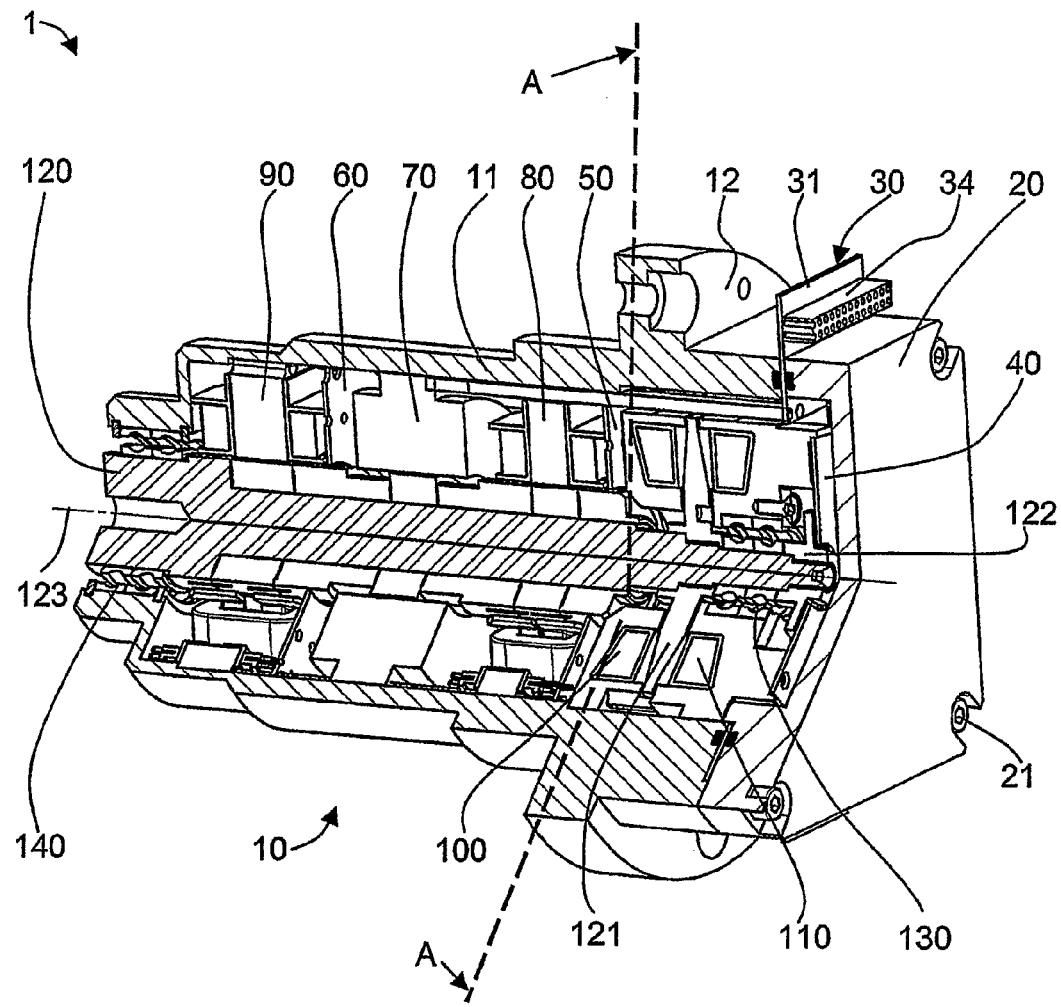
Figure 2:
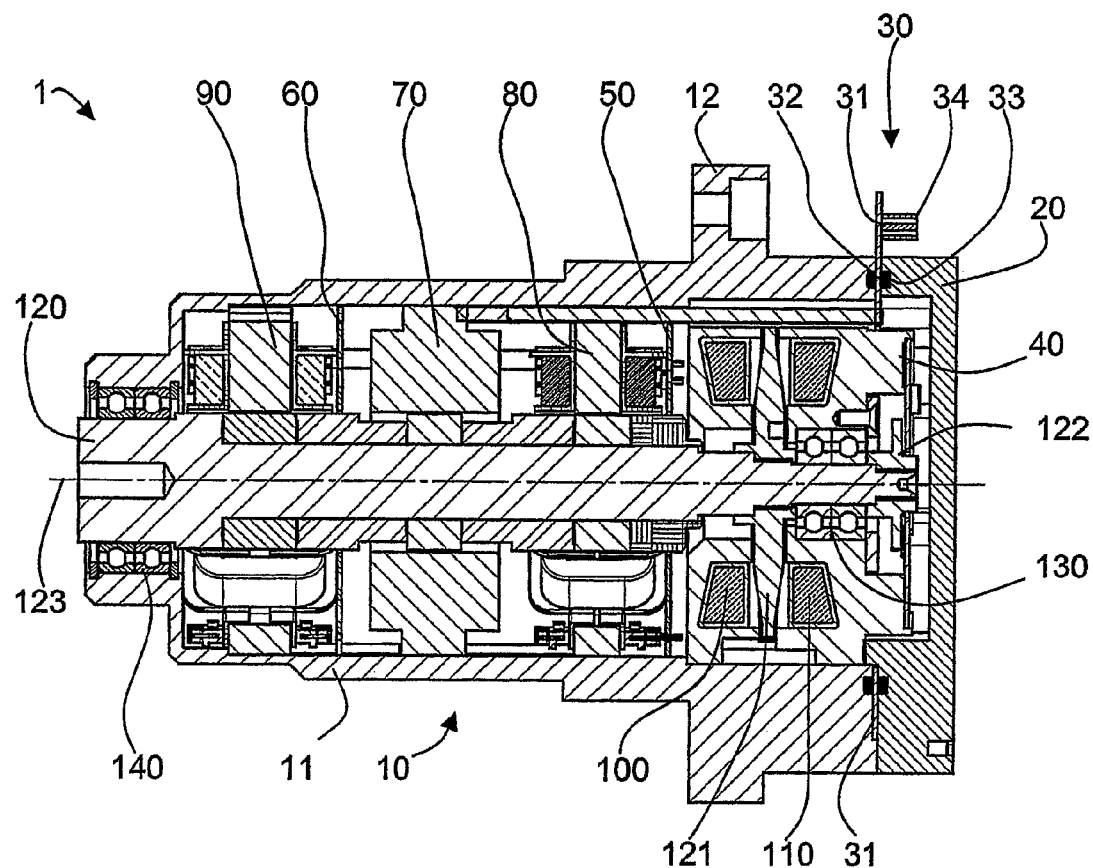
FIG. 2. shows a cross section of the magnetic bearing device of FIG. 1 in the plane A-A.
Figure 3:
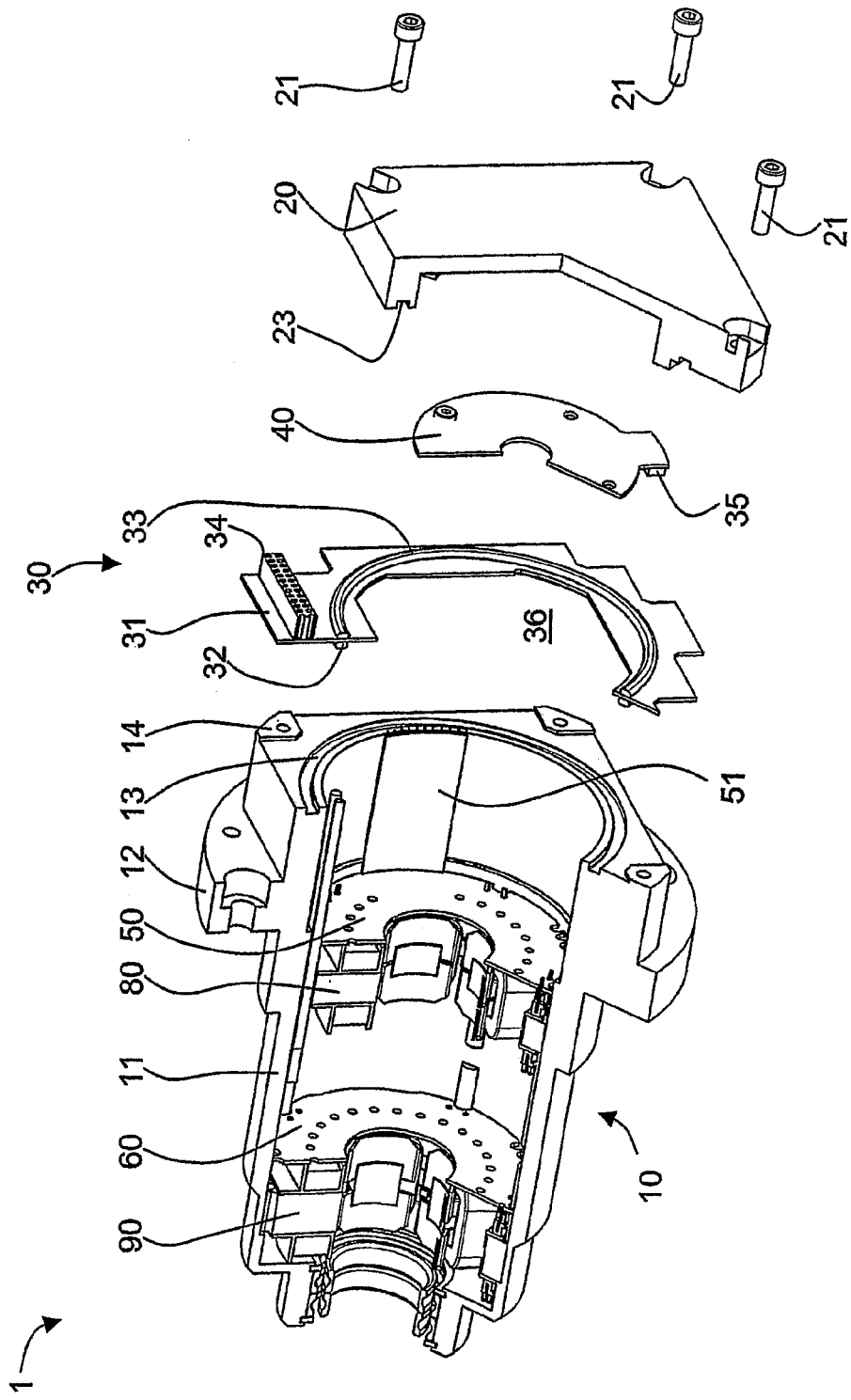
FIG. 3. shows a partial exploded view of the magnetic bearing device of FIG. 1.

FIGS. 1 to 3 show a magnetic bearing device as it is suitable, e.g., for supporting the rotor blades of a turbomolecular pump (TMP). A rotor shaft 120 is suspended magnetically in this device for rotation around a rotation axis 123. To this end, a number of magnetic bearing units is provided. A pair of axial or thrust bearing units 100, 110 interact with a thrust disk 121 mounted on the rotor shaft 120 and stabilize the position of the shaft against translational displacements in the axial direction. A first radial bearing unit 80 and a second radial bearing unit 90 stabilize the positions of those shaft portions which are close to these bearing units against radial displacements, thereby achieving stabilization against translational displacements of the shaft in the radial directions and of tilt displacements around the radial directions. A motor unit 70 drives the rotation of the shaft. Auxiliary touch-down bearings implemented as dual ball bearings 130, 140 keep the shaft in place in case that the magnetic bearings are switched off or fail. Alternatively other types of bearings can be used, e.g. single ball bearings or sliding bearings.

A number of sensor units is provided for detecting displacements of the shaft. An axial displacement sensor is formed on a first sensor board 40, while radial displacement sensors are formed on second and third sensor boards 50, 60. These sensors detect displacements of the shaft along predetermined directions.

The bearing units-as well as the sensor boards are enclosed by a housing 10. The signals from the sensors are fed to a control unit (not shown in FIG. 1) which is disposed outside of the housing 10. In the control unit, appropriate control voltages or currents for the bearing units are derived from these signals and are fed from the control unit to the bearing units.

For feeding the signals and currents between the control unit and the magnetic bearing device, an electrical feedthrough 30 through the wall of the housing 10 is provided. The feedthrough 30 is best viewed in the partial exploded view of FIG. 3. In this view, a number of components of the magnetic bearing device have been left away for better visibility of the rest of the components. In particular, the motor unit 70, the axial bearing units 100, 110 and the touch-down bearings 130, 140 have been removed from FIG. 3.

The feedthrough 30 comprises a printed circuit board (PCB) 31 extending essentially perpendicular to the long axis of the housing 10 (i.e., perpendicular to the rotation axis). The board extends across the wall of the housing 10 and sections the wall all the way along an inner circumference of the housing, i.e., it divides the housing into two parts. The cross-section along which the board extends is perpendicular to the rotation axis.

The printed circuit board 31 comprises at least three layers. One or more inner, electrically conductive trace layers are covered on both sides by insulating substrate layers. Along the edges around its circumference, the board is coated by a gas-tight coating, e.g., it is metallized. Likewise, the inner circumference of the central opening of the board, to be further described below, is preferably coated in such a manner.

A first (outer) connector 34 is mounted on the PCB on the outside of the housing 10. It serves for connecting the control unit to the PCB. The control unit can be connected directly or by a cable. Two inner connectors, of which only the connector 35 is visible in FIG. 3, are provided on the inside of the housing for connecting the sensor boards 40, 50, 60, the bearing units 80, 90, 100, 110 and the motor 70 to the PCB. The trace layer forms a plurality of electrical connections (traces) between the outer and inner connectors, thus providing the desired electrical feedthrough between the inside and the outside of the housing.

The board 31 divides the housing 10 into a main body 11 and a cap 20. Screws 21 secure the cap 20 to the main body 11, whereby also the board 31 is held in its place between the main body 11 and the cap 20. Small protrusions 14 on the main body 11 and similar protrusions on the cap together with corresponding recesses on the board 31 ensure that the board 31 is correctly centred radially.

On the main body 11, a radial flange 12 is provided for mounting the magnetic bearing device to, e.g., a pump housing. An O-ring or another form of sealing gasket may be provided between the left side of the flange 12 and the pump housing in order to provide a vacuum-tight mounting of the magnetic bearing device on the pump housing. The pump housing then closes the inside of the housing 10 of the magnetic bearing device towards the outside.

The board 31 is sealed in a gas-tight manner to the main body 11 and to the cap 20 by means of two O-rings 32, 33. The first O-ring 32 is partially accommodated in a circular groove 13 formed in the main body 11. Likewise, the second O-ring 33 is partially accommodated in a circular groove 23 in the cap 20. These grooves ensure that the O-rings are held in their positions, and they improve tightness against gas leaks by providing circular edges against which the O-rings can seal. Instead of O-rings other types of seals are possible, e.g. flat seals (gaskets) or a seal moulded directly to the printed circuit board.

The first sensor board 40 is directly and releasably connected to the feedthrough 30 by the inner connector 35. This sensor board 40 does not only comprise an axial displacement sensor formed in the conductive layers of the sensor board 40 itself, but also connections for the axial bearing units 100, 110. The bearing units 100, 110 are connected to the sensor board 40 by means of a further connector, which is not visible in FIGS. I to 3. In addition, a rotation sensor (pulse sensor or resolver) is formed in the conductive layer of the first sensor board 40.

The second sensor board 50 is connected to the feedthrough 30 by means of a flat-ribbon cable 51. The coil wires of the first radial bearing unit 80 are connected to the second sensor board 50 by a wire-terminal connection not visible in FIGS. 1 to 3. A second flat-ribbon cable which is not visible in FIGS. 1 to 3 extends from the feedthrough 30 to the third sensor board 60. The coil wires of the second radial bearing unit are connected to that board by a further wire-terminal connection which is not visible in FIGS. 1 to 3. On the second and third sensor boards, all necessary electric connections for distributing bearing currents and sensor signals are provided as appropriate traces in the conductive (trace) layers.

The use of flat-ribbon cables-(or, alternatively, flexprints) and printed-circuit distribution boards such as the sensor boards 50, 60 for distributing the signals/currents carried by the flat ribbon cables enables a very clean cabling. Cabling and assembly of the magnetic bearing device is further simplified by using releasable (socket-and-plug type) connectors between the flat ribbon cables and the printed circuit boards or by providing wire-terminal connections for these cables on the boards.

The radial displacement sensors are preferably of the type disclosed in WO-A 2004/048883, the disclosure of which is included herein by reference in its entirety for teaching a device for contact-less measurements of displacements of a shaft in multiple directions. Such a multiple-axis radial displacement sensor comprises a primary inductive element placed around the shaft, and a plurality of secondary inductive elements disposed in the vicinity of this primary inductive element. By providing a time-varying current to the primary inductive element and detecting the induced voltages in the secondary elements, displacements of the shaft can be determined. All inductive elements may readily be implemented as printed coils on a single, common printed circuit board. Thereby, a highly efficient and very simple radial displacement sensor is achieved. In particular, each of the second and third sensor boards 50, 60 preferably implements such a multiple-axis radial displacement sensor in its conductive (trace) layers.

The axial displacement sensor may likewise be implemented in the conductive layers of the first sensor board. Such a sensor may be of a conventional single- or multi-coil eddy-current sensor type, which determines a distance between the first sensor board and a radial flange on the nut 122 at the end of the shaft 120. Alternatively, the axial displacement sensor may be of the kind disclosed in EP application No. 05 405 009.1 filed Jan. 11, 2005, which is incorporated herein by reference in its entirety for teaching an axial displacement sensor and a rotation sensor. Such an axial displacement sensor comprises two concentric and essentially coplanar coils which are fed with AC currents of the same frequency, but with opposite phases (opposite directions around the rotation axis). Thereby, the sensitive area of the sensor is essentially limited to the area between the coils, and disturbances are greatly reduced.

Also the rotation sensor may be implemented in the conductive layers of the first sensor board, e.g., in the manner described in EP application No. 05 405 009.1 referenced above. Such a multiple-axis radial displacement sensor is very similar in its setup to the multi-axis radial displacement sensor described above, i.e., it comprises a primary inductive element placed around the shaft, and a plurality of further inductive elements disposed in the vicinity of this primary inductive element. In particular, the primary inductive element is placed around a portion of the nut 122 at the end of the shaft 120, which portion is not rotation-symmetric, but has at least one notch or recess. By providing a time-varying current, in particular, a high-frequency AC current, to the primary inductive element and detecting the induced voltages in the secondary elements, the rotary state of the rotor may be determined. The inductive elements may again be readily implemented as printed coils in the conductive layers of the first sensor board. In particular, the primary inductive element may be identical with one of the coils of the axial displacement sensor, further simplifying the setup.

In an alternative embodiment, one of the radial displacement sensors may be disposed on the same side of the axial bearings 100, 110 as the axial displacement sensors, and these sensors may even be combined in a single multiple-sensing unit, as described, e.g., in WO 2005/026557.

It is to be understood that the present invention is not limited to an embodiment in which the sensors are implemented in the conducting layer of printed circuit boards, and in which these boards are connected by flat ribbon cables. On the other hand, such an implementation of the sensors and the proposed wiring are both advantageous even if the electrical feedthrough through the housing wall is established in another manner than described herein.

All printed circuit boards (sensor boards 40, 50, 60 and the PCB of feedthrough 30) have concentric openings for accommodating the shaft. In particular, the board 31 of feedthrough 30 has an opening 36 whose diameter is larger than the diameters of the axial bearing units 100, 110 and of the thrust disk 121. In this way, the magnetic bearing device may be assembled easily, and the axial bearings as well as the shaft remain easily accessible in case that servicing should prove necessary.

Figure 4:
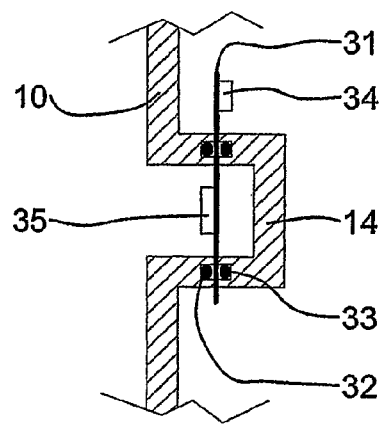
FIG. 4. shows a highly schematic partial sectional view of a housing of a magnetic bearing device with a feedthrough according to a second embodiment.

An alternative way of arranging the electrical feedthrough 30 relative to the housing 10 is schematically illustrated in FIG. 4. Similar parts carry the same reference numbers as in FIGS. 1 to 3. Instead of sectioning the housing in a region where its diameter is large, a feedthrough of reduced size is obtained by sectioning a small-diameter part of the housing, e.g., a protrusion at the side of the housing or on the end cap. Again, the feedthrough 30 comprises an outer connector 34 and an inner connector 35. Also the manner in which the board 31 is sealed to the housing remains the same as in the embodiment of FIGS. 1 to 3. The opening in the housing 10 is eventually closed by a cap 14. Naturally, in this embodiment the board 31 does not need to have a central opening, which simplifies the setup and provides the additional advantage that no leaks can occur at the central opening. If the board contains no other holes, no seal is needed on the side of the board facing the outside of the housing 10, and the seal 33 may be omitted. Small holes for equipping the board with connectors or other circuit elements may be closed by a droplet of filling solder. This alternative arrangement of the feedthrough is particularly well suited for applications where the housing is accessible from the side and which therefore do not require all wires to be near one end of the rotor.

Figure 5:
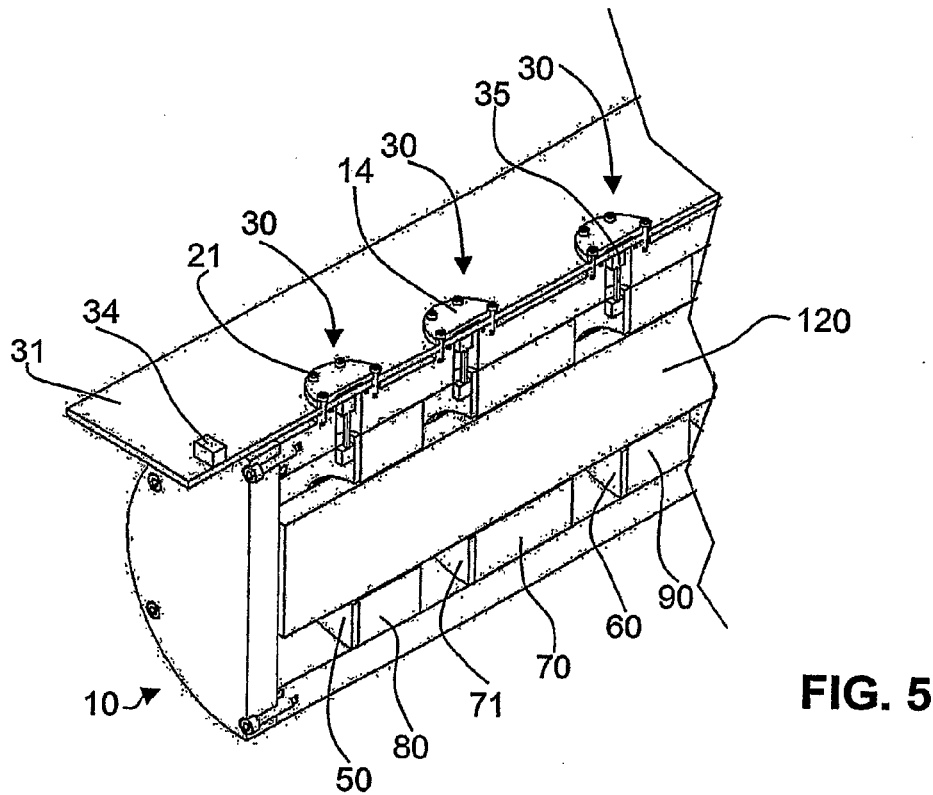
FIG. 5. shows a schematic perspective view of a magnetic bearing device according to a third embodiment.
Figure 6:
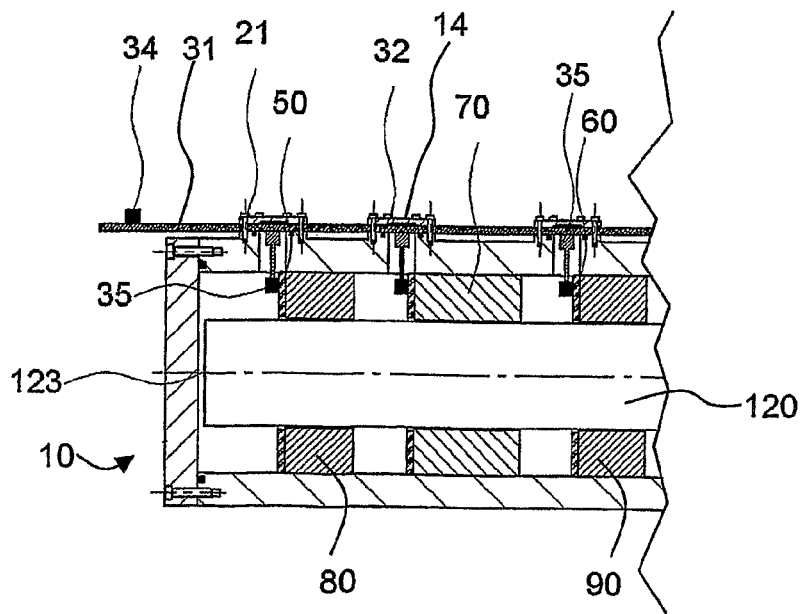
FIG. 6. shows a cross section of the device of FIG. 5.

In FIGS. 5 and 6, a partial view of an alternative embodiment of a magnetic bearing device is shown. Again, similar parts carry the same reference numbers as in FIGS. 1 to 4. A plurality of feedthroughs 30 (in this particular example, three) are implemented as a single printed circuit board 31 which is placed along one side of the housing in parallel to the rotor axis. This alternative arrangement simplifies wiring inside the housing 10 at the expense of more sealing points. Each unit inside the housing (sensor boards 50, 60, bearing units 80, 90, motor 70) has its own Individual connector 35, which completely renders any cabling unnecessary. This significantly simplifies assembly of the magnetic bearing device. In particular, the motor unit 70 has its own distribution board 71. Of course, also several of the units. within the housing may share one feedthrough. Each connector 35 may comprise a flexprint to allow for some flexibility and lateral movability. After assembly of the units inside the housing 10, the connectors 35 are still accessible from the side of the housing through holes which will eventually be closed off by the feedthrough 30 and the caps 14. A single printed circuit board 31 is mounted to these connectors outside of the housing in parallel to the rotor axis and is held on top of these holes by caps 14. Thus the single board 31 serves as a feedthrough at each of the holes. The caps may be held in place by screws 21, as shown in the Figures, or by other suitable means, such as a clamping fixture.

Figure 7:
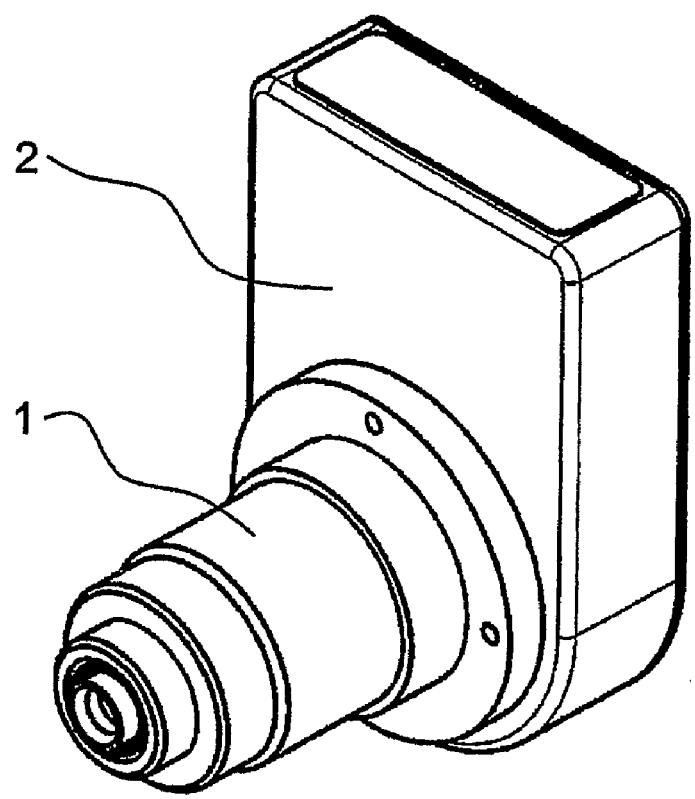
FIG. 7. shows a perspective view of a magnetic bearing device together with a control unit.

Because of the simplicity of its electric connections and the compact size that can be achieved, the magnetic bearing device according to the present invention may be readily integrated with its control unit, as illustrated by the way of example in FIG. 7. Here, a magnetic bearing device 1 according to the present invention is directly mounted to a control unit 2. All wiring can be done by flat ribbon cables or flexprints.

The magnetic bearing device according to the present invention is particularly useful if it is comprised in a vacuum pump, in particular a turbo-molecular vacuum pump, in which the rotor shaft carries a plurality of pump blades. A different application may be a turbopump for a gas compressor as it is used, e.g., in air conditioners. It is to be understood, however, that the invention is not limited to such applications.

LIST OF REFERENCE SIGNS

1 magnetic bearing device
2 control unit
10 housing 11 main body
12 flange
13 circular groove
14 cap
20 cap
21 screw
23 circular groove
30 electrical feedthrough
31 printed circuit board
32 first O-ring
33 second O-ring
34 first print connector
35 second print connector
36 opening
40 first sensor board
50 second sensor board
60 third sensor board
70 motor
71 distribution board
80 first radial bearing
90 second radial bearing
100 first axial bearing
110 second axial bearing
120 rotor
121 rotor disk
122 nut
123 rotation axis
130 first auxiliary bearing
140 second auxiliary bearing

The invention claimed is:

1. A magnetic bearing device comprising:
a housing having an inside and an outside;
at least one active magnetic bearing element disposed in the inside of said housing;
a rotor shaft to be supported by said at least one active magnetic bearing element for rotation around a rotation axis; and
a feedthrough for providing a plurality of electrical connections between the inside and the outside of said housing,
said feedthrough comprising an essentially flat connection element having a plurality of electric conductors connecting said inside and said outside and being arranged essentially in a common plane, said connection element extending across a wall of said housing in a direction essentially perpendicular to said rotation axis,
said connection element having an opening receiving said rotor shaft, and
said feedthrough comprising sealing means for sealing at least a portion of said connection element disposed inside said housing in a gas-tight manner.

2. The magnetic bearing device according to claim 1, wherein said connection element is one of a rigid, flexible or rigid-flex printed circuit board.

3. The magnetic bearing device according to claim 1, wherein said connection element intersects the wall of said housing all the way along a circumference of said housing.

4. The magnetic bearing device according to claim 1, wherein said rotor shaft has a first diameter, wherein the rotor shaft carries a thrust disk having a second diameter, and wherein said opening of said connection element has a third diameter which is larger than the second diameter of said thrust disk.

5. The magnetic bearing device according to claim 1, wherein said connection element has an outer and/or inner circumference coated in an gas-tight manner.

6. The magnetic bearing device according to claim 1, said magnetic bearing device comprising a sensor board that comprises at least one sensor for detecting at least one of a displacement and a rotary state of said rotor shaft, said sensor board being directly electrically connected to said feedthrough by means of a connector bridging an axial gap between said feedthrough and said sensor board.

7. The magnetic bearing device according to claim 1, said magnetic bearing device comprising at least one of a flat-ribbon cable and a flexprint connected to said feedthrough on the inside of said housing.

8. The magnetic bearing device according to claim 7, said magnetic bearing device comprising a distribution board connected to one of said flat-ribbon cable and said flexprint, said distribution board extending perpendicular to said rotation axis, having an opening for receiving said rotor shaft and comprising a plurality of electrical conductors for distributing signals carried by said flat-ribbon cable or flexprint.

9. The magnetic bearing device according to claim 1, wherein said connection element comprises a first section which is essentially planar and extends between the inside and the outside of said housing, a second section which is flexible and has at least one substantial bend, and a third section which is essentially planar and constitutes a distribution board comprising a plurality of electrical conductors for distributing signals.

10. The magnetic bearing device according to claim 8 or 9, wherein said distribution board comprises a displacement sensor for detecting displacements of said rotor shaft.

11. The magnetic bearing device according to claim 10, wherein said displacement sensor comprises a plurality of inductive elements implemented as printed coils within at least one conductive layer of said distribution board.

12. A vacuum pump comprising a magnetic bearing device according to claim 1.

13. The vacuum pump of claim 12, the vacuum pump being a turbo-molecular pump.

14. A magnetic bearing device for supporting a rotor shaft for rotation around a rotation axis, said magnetic bearing device comprising:
a housing having an inside and an outside;
at least one active magnetic bearing element disposed in the inside of said housing;
a rotor shaft to be supported by said at least one active magnetic bearing element; and
a feedthrough for providing a plurality of electrical connections between the inside and the outside of said housing, said feedthrough comprising an essentially flat connection element having a plurality of electric conductors connecting said inside and said outside and being arranged essentially in a common plane, said connection element being mounted essentially parallel to the rotor axis along one lateral side of said housing, the housing having a plurality of lateral openings, the connection element being held on top of each opening by a corresponding cap, and said feedthrough comprising sealing means for sealing any portions of said connection element disposed inside said housing in a gas-tight manner.

15. The magnetic bearing device according to claim 14, wherein said connection element has an outer and/or inner circumference coated in an gas-tight manner.

* * * * *